(12) United States Patent
Maattanen et al.

(10) Patent No.: US 11,558,765 B2
(45) Date of Patent: Jan. 17, 2023

(54) CONTROL INFORMATION BASED ACTIVATION OF MEASUREMENT REPORTING CONFIGURATIONS

(71) Applicant: Telefonaktiebolaget LM Ericsson (publ), Stockholm (SE)

(72) Inventors: Helka-Liina Maattanen, Helsinki (FI); Siva Muruganathan, Stittsville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 35 days.

(21) Appl. No.: 15/734,767

(22) PCT Filed: Jun. 3, 2019

(86) PCT No.: PCT/IB2019/054593
§ 371 (c)(1),
(2) Date: Dec. 3, 2020

(87) PCT Pub. No.: WO2019/234595
PCT Pub. Date: Dec. 12, 2019

(65) Prior Publication Data
US 2021/0235297 A1 Jul. 29, 2021

Related U.S. Application Data

(60) Provisional application No. 62/680,425, filed on Jun. 4, 2018.

(51) Int. Cl.
*H04W 72/04* (2009.01)
*H04W 24/10* (2009.01)
(Continued)

(52) U.S. Cl.
CPC ........... *H04W 24/10* (2013.01); *H04L 1/1614* (2013.01); *H04W 80/02* (2013.01); *H04W 84/06* (2013.01)

(58) Field of Classification Search
CPC ..... H04W 24/10; H04W 80/02; H04W 84/06; H04W 36/0094; H04W 36/0085; H04L 1/1614
See application file for complete search history.

(56) References Cited

U.S. PATENT DOCUMENTS

2016/0157165 A1* 6/2016 Xie .................. H04W 36/0085
455/434
2017/0353989 A1 12/2017 Kim
(Continued)

FOREIGN PATENT DOCUMENTS

| EP | 2690816 A2 | 1/2014 |
|---|---|---|
| WO | 2014012382 A1 | 1/2014 |

OTHER PUBLICATIONS

International Search Report and Written Opinion dated Jul. 29, 2019 for International Application No. PCT/IB2019/054593 filed on Jun. 3, 2019, consisting of 11-pages.
(Continued)

*Primary Examiner* — Mahbubul Bar Chowdhury
(74) *Attorney, Agent, or Firm* — Christopher & Weisberg, P.A.

(57) ABSTRACT

A method and apparatus are disclosed. A base station configured to communicate with a user equipment is provided. The base station is configured to indicate a plurality of measurement reporting configurations associated with a measurement object configuration, and transmit control information to activate at least one of the plurality of measurement reporting configurations. The UE is configured to receive an indication of a plurality of measurement reporting configurations associated with a measurement object configuration, receive control information activating at least one of the plurality of measurement reporting configurations and report at least one measurement based at
(Continued)

least in part on the activated at least one of the plurality of measurement reporting configurations.

10 Claims, 8 Drawing Sheets

(51) Int. Cl.
*H04L 1/16* (2006.01)
*H04W 80/02* (2009.01)
*H04W 84/06* (2009.01)

(56) References Cited

U.S. PATENT DOCUMENTS

| | | | | |
|---|---|---|---|---|
| 2018/0324662 | A1* | 11/2018 | Phuyal | H04B 7/18504 |
| 2019/0166516 | A1* | 5/2019 | Kim | H04W 24/10 |
| 2020/0033849 | A1* | 1/2020 | Yiu | G05D 1/0022 |
| 2020/0169928 | A1* | 5/2020 | Hong | H04W 36/0085 |
| 2020/0221357 | A1* | 7/2020 | Hong | H04W 36/0085 |
| 2021/0144611 | A1* | 5/2021 | Wigard | H04W 36/32 |

OTHER PUBLICATIONS

R2-1801994—(Revision of R2-1800899); 3GPP TSG-RAN WG2 Meeting#101; Title: MAC 1OCEs for beam management; Source: VIVO; Agenda Item: 10.3.1.3; Document for: Discussion and decision; Date and Location: Feb. 26-Mar. 2, 2018, Athens, Greece, consisting of 10-pages.

3GPP TS 38.331 V15.1.0; 3rd Generation Partnership Project; Technical Specification Group Radio Access Network NR; Radio Resource Control (RRC) Protocol Specification (Release 15); Mar. 2018, Valbonne, France, consisting of 268-pages.

RI-1720562; 3GPP Draft; Discussion on beam information indication for CA and DC; 3rd Generation Partnershi P Project (3GPP), Mobile Competence Centre ; 650, Route Des Lucioles ; F-06921 Sophia-Anti Polis Cedex, France; Nov. 27-Dec. 1, 2017; consisting of 10-pages.

* cited by examiner

FIG. 2

CONTROL INFORMATION BASED ACTIVATION OF MEASUREMENT REPORTING CONFIGURATIONS

CROSS-REFERENCE TO RELATED APPLICATIONS

This application is a Submission Under 35 U.S.C. § 371 for U.S. National Stage Patent Application of International Application No.: PCT/IB2019/054593, filed Jun. 3, 2019 entitled "CONTROL INFORMATION BASED ACTIVATION OF MEASUREMENT REPORTING CONFIGURATIONS," which claims priority to U.S. Provisional Application No.: 62/680,425, filed Jun. 4, 2018, entitled CONTROL INFORMATION BASED ACTIVATION OF MEASUREMENT REPORTING CONFIGURATIONS, the entireties of both of which are incorporated herein by reference.

FIELD

The present disclosure relates to wireless communications, and in particular, to activating at least one indicated measurement reporting configuration.

BACKGROUND

A Third Generation Partnership Project (3GPP) Technical Specification (TS) Release-15 item (3GPP Release 15 item) on enhanced Long Term Evolution (LTE) support for aerial vehicles is based on the preceding study whose outcome was documented in 3GPP Technical Report (TR) 36.777. The 3GPP Release 15 item aims to specify features that can improve the efficiency and robustness of terrestrial LTE network for providing aerial connectivity services, particularly for low altitude unmanned aerial vehicles (e.g., drones).

The flying mode detection, i.e., detecting whether the user equipment (UE) is with an air travelling user or on board an airplane or otherwise in flight, is an issue. The flying mode detection is also related to interference detection as the interference conditions for flying aerial user equipment's (UEs) are different from aerial UEs in terrestrial mode. For interference detection, which may also serve as input to flying mode detection, an enhancement to existing events triggering of Reference Signal Received Quality (RSRQ)/Reference Signal Received Quality (RSRQ)/Reference Signal (RS)-Signal to Interference & Noise Ratio (SINR) reports was introduced in 3GPP TS Release 15. The UE may be configured to trigger an event such as A3, A4, A5, which all consider neighbor cell measurements. In such event triggers, a measurement report is triggered when multiple cells' measured Reference Signal Received Powers (RSRPs) and/or RSRQs/RS-SINRs are above a threshold. For example, event A3 triggers when neighbor cell measured RSRP becomes better than the measured RSRP of a Primary Cell (PCell)/Primary Secondary Cell (PSCell) by a certain amount. The enhanced triggering introduced in 3GPP TS Release 15 may require, e.g., three neighbor cell RSRP values to become higher than the PCell/PSCell RSRP value by a certain amount in order to trigger a measurement report.

Another input to flying mode detection is event triggered height and location reporting. A new configurable event within Radio Resource Management (RRM) with height threshold is introduced for 3GPP TS Release 15 Aerial UEs. When the UE is configured with this event, a report is triggered when UE's altitude crosses the threshold altitude. In addition to flying mode detection, the exact height information is considered useful as the network or base station may choose to reconfigure for example measurement reporting configurations for the UE when it crosses a height threshold. FIG. 1 depicts an example of this situation. In FIG. 1, when the UE is below a height of 100 m, the aerial UE is Radio Resource Control (RRC) configured with measurement reporting configurations and event triggered height/location reporting corresponding to a height threshold of 200 m. As the aerial UE crosses a height threshold of 200 m, a report is trigged from the UE to the network or base station. After receiving the report from the aerial UE, the network RRC reconfigures the aerial UE with new measurement reporting configurations.

For aerial UEs, the Downlink (DL) interference and the down-titled base station (BS) antennas contribute to a worse perceived SINR, a fast-changing best cell and possibly a faraway best cell, compared to the terrestrial UEs. That is, it is likely that UEs in airborne mode should be configured differently compared to a terrestrial UE. One proposed system includes scaling the time-to-trigger (TTT) parameter that defines when a measurement result is sent by the UE after an event is triggered. When the UE is airborne, it may be beneficial to trigger measurement results earlier compared to terrestrial UEs. This is similar to existing LTE standards where TTT can be scaled based on a mobility state of the UE, where a mobility state is defined as a number of handovers (Hos) seen by the UE based on certain configuration. Similarly, in idle mode of LTE, a cell reselection threshold can be scaled based on UEs mobility state. This has also been proposed for aerial UEs based on height/airborne status.

Conditioning the UE information elements (IEs) for measurement reporting configuration with airborne status/height is possible due to the LTE radio resource management (RRM) measurement framework. A measurement object (MO) points to an Evolved Universal Mobile Telecommunications System Terrestrial Radio Access (EUTRAN) carrier and different reporting configurations may be linked to the same MO. Each linkage is identified by a measurement identifier (ID).

The following Information Elements (IEs) are provided for reference:
- The IE MeasId is used to identify the linking of a measurement object and a reporting configuration.
- The IE MeasObjectId is used to identify a measurement object configuration.
- The IE ReportConfigId is used to identify a measurement reporting configuration.

MeasIdToAddModList information element may correspond to the following:

```
-- ASN1START
MeasIdToAddModList ::=              SEQUENCE (SIZE
(1..maxMeasId)) OF MeasIdToAddMod
MeasIdToAddModList-v1310 ::=        SEQUENCE (SIZE (1..maxMeasId)) OF
MeasIdToAddMod-v1310
MeasIdToAddModListExt-r12 ::=       SEQUENCE (SIZE (1..maxMeasId)) OF
```

```
MeasIdToAddModExt-r12
MeasIdToAddModListExt-v1310 ::=      SEQUENCE (SIZE (1..maxMeasId)) OF
MeasIdToAddMod-v1310
MeasIdToAddMod ::=      SEQUENCE {
    measId                               MeasId,
    measObjectId                         MeasObjectId,
    reportConfigId                       ReportConfigId
}
MeasIdToAddModExt-r12 ::=      SEQUENCE {
    measId-v1250                         MeasId-v1250,
    measObjectId-r12                     MeasObjectId,
    reportConfigId-r12                   ReportConfigId
}
MeasIdToAddMod-v1310 ::=SEQUENCE {
    measObjectId-v1310         MeasObjectId-v1310
    OPTIONAL
}
-- ASN1STOP
```

The same structure for RRM may be adopted in New Radio (NR) as indicated in 3GPP TS 38.331, version 15.1.0, and thus what is described here may be valid for NR, as well.

In some wireless communication standards such as NR, different MAC control elements (CE) have been used for controlling Channel State Information (CSI) related configurations. For example, the Channel State Information (CSI)-Reference Signal (RS) and CSI reporting schemes of NR are described below:

CSI-RS and CSI reporting in NR

In NR, the following types of CSI reporting are supported:

Periodic CSI Reporting: CSI is reported periodically by the UE. Parameters such as periodicity and slot offset are configured semi-statically, by higher layer signaling from the gNB to the UE.

Aperiodic CSI Reporting (AP CSI Reporting): This type of CSI reporting involves a single-shot (i.e., one time) CSI report by the UE which is dynamically triggered by the gNB, e.g., by the Downlink Control Information (DCI) in Physical Downlink Control Channel (PDCCH). Some of the parameters related to the configuration of the aperiodic CSI report is semi-statically configured from the gNB to the UE but the triggering is dynamic.

Semi-Persistent CSI Reporting: similar to periodic CSI reporting, semi-persistent CSI reporting has a periodicity and slot offset which may be semi-statically configured by the gNB to the UE. However, a dynamic trigger from gNB to UE may be used to allow the UE to begin semi-persistent CSI reporting. In some cases, a dynamic trigger from gNB to UE may be used to command the UE to stop the semi-persistent transmission of CSI reports.

Generally, a CSI report setting contains the parameters associated with CSI reporting including the type of CSI reporting. The semi-persistent CSI-reporting configuration is specified to be controlled by a MAC CE specified in 3GPP TS 38.321 version 15.1.0, for example, as follows:

Section/subclause 5.18.6 of 3GPP TS 38.321 version 15.1.0—Activation/Deactivation of Semi-persistent (SP) CSI reporting on Physical Uplink Control Channel (PUCCH)

The network may activate and deactivate the configured Semi-persistent CSI reporting on PUCCH of a Serving Cell by sending the SP CSI reporting on PUCCH Activation/Deactivation MAC CE described in subclause 6.1.3.16 (shown below). The configured Semi-persistent CSI reporting on PUCCH is initially deactivated upon configuration and after a handover.

The MAC entity can:

1> if the MAC entity receives an SP CSI reporting on PUCCH Activation/Deactivation MAC CE on a Serving Cell:

2> indicate to lower layers the information regarding the SP CSI reporting on PUCCH Activation/Deactivation MAC CE.

Section/subclause 6.1.3.16 of 3GPP TS 38.321 version 15.1.0—SP CSI reporting on PUCCH Activation/Deactivation MAC CE The SP CSI reporting on PUCCH Activation/Deactivation MAC CE is identified by a MAC Protocol Data Unit (PDU) subheader with Logical Channel ID (LCID) as specified in Table 6.2.1-1 of 3GPP TS 38.321 version 15.1.0. It may have a fixed size of 16 bits with following fields:

Serving Cell ID: This field indicates the identity of the Serving Cell for which the MAC CE applies. The length of the field may be 5 bits;

Bandwidth Part (BWP) ID: This field contains BWP-Id, as specified in 3GPP TS 38.331 version 15.1.0, of a downlink bandwidth part for which the MAC CE applies. The length of the BWP ID field may be 2 bits;

Si: This field indicates the activation/deactivation status of the Semi-Persistent CSI report configuration within csi-ReportConfigToAddModList, as specified in 3GPP TS 38.331 version 15.1.0. S0 refers to the first report configuration within the list with type set to "semiPersistentOnPUCCH", S1 to the second report configuration within the list with type set to "semiPersistentOnPUCCH" and so on. The Si field may be set to "1" to indicate that the Semi-Persistent CSI report configuration i may be activated. The Si field is set to "0" to indicate that the Semi-Persistent CSI report configuration i may be deactivated. If there is no Semi-Persistent CSI report configuration i within the list, MAC entity may ignore this field;

R: Reserved bit, set to "0".

Figure 2:
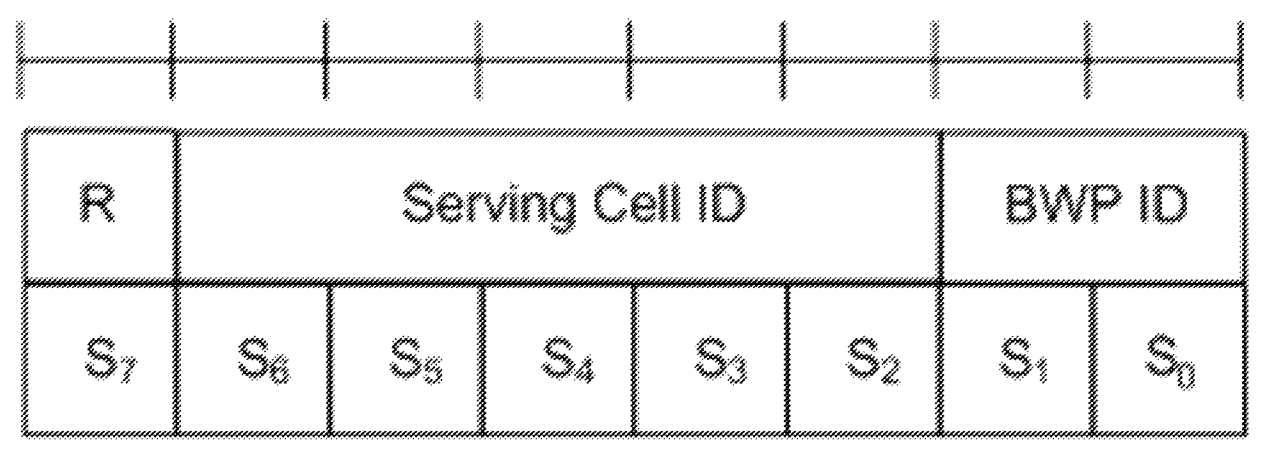

FIG. 2 is a block diagram of an example of SP CSI reporting on PUCCH activation/deactivation MAC CE, illustrating the various fields discussed above.

However, 3GPP TS Release 15, describe above, is based on UE reporting of height and/or interference, which may only happen for flying UEs. When the reporting configurations are to be changed, the network may reconfigure the UE by RRC. For aerial UEs, this may be too slow for optimum performance since the aerial UE may see a fast-changing best cell and interfering cells based on the aerial UE height.

While RRC reconfiguration is configured by the network or base station, the RRC reconfiguration procedure may still be too slow. Further, UE based scaling for reporting the whole configuration is not network controlled and may thus be very difficult to test.

SUMMARY

Some embodiments advantageously provide methods, systems, and apparatuses for activating at least one indicated measurement reporting configuration.

It may in some cases be better to have faster network controlled solution for RRM parameter scaling. In order to have a faster network controlled method to switch between RRM reportConfigs given to the UE, the solution provided in Example 1 (described in more detail below) introduces a MAC control element (CE) to handle the switch and the related RRC configuration to set it up, thereby e.g., providing for a faster network controlled solution to switching between measurement reporting configurations (as compared to existing techniques).

The solution provided in Example 2 (described in more detail below) provides a method to activate multiple RRM reportConfigs and allows the UE choose one of the activated RRM reportConfigs based on UE's height or flight mode, thereby e.g., providing for a network semi-controlled solution to switching between measurement reporting configurations. This solution provided in Example 2 can be considered a tradeoff between the solution in Example 1 and the solution of pure UE based scaling when it comes to the time for switching between measurement reporting configurations.

According to a first aspect of the present disclosure, a base station configured to communicate with a user equipment, UE, is provided. The base station includes processing circuitry, the processing circuitry configured to cause the base station to indicate a plurality of measurement reporting configurations associated with a measurement object configuration; and transmit control information to activate at least one of the plurality of measurement reporting configurations.

In some embodiments of the first aspect, the processing circuitry is further configured to cause the base station to transmit the control information by being configured to cause the base station to transmit a Medium Access Control, MAC, Control Element, CE to activate the at least one of the plurality of measurement reporting configurations. In some embodiments of the first aspect, the processing circuitry is further configured to cause the base station to transmit the control information by being configured to cause the base station to transmit a bitmap to activate the at least one of the plurality of measurement reporting configurations. In some embodiments of the first aspect, the processing circuitry is further configured to cause the base station to transmit the control information by being configured to cause the base station to transmit a Medium Access Control, MAC, Control Element, CE to activate a subset of the plurality of measurement reporting configurations, the subset being selectable by the UE.

According to a second aspect of the present disclosure, a method implemented in base station is provided. The method comprises indicating a plurality of measurement reporting configurations associated with a measurement object configuration. The method comprises transmitting control information to activate at least one of the plurality of measurement reporting configurations.

In some embodiments of the second aspect, the transmitting the control information further comprises transmitting a Medium Access Control, MAC, Control Element, CE to activate the at least one of the plurality of measurement reporting configurations. In some embodiments of the second aspect, the transmitting the control information further comprises transmitting a bitmap to activate the at least one of the plurality of measurement reporting configurations. In some embodiments of the second aspect, the transmitting the control information further comprises transmitting a Medium Access Control, MAC, Control Element, CE to activate a subset of the plurality of measurement reporting configurations, the subset being selectable by the UE.

According to a third aspect of the present disclosure, a user equipment, UE, configured to communicate with a base station is provided. The UE includes processing circuitry, the processing circuitry configured to cause the UE to receive an indication of a plurality of measurement reporting configurations associated with a measurement object configuration; receive control information activating at least one of the plurality of measurement reporting configurations; and report at least one measurement based at least in part on the activated at least one of the plurality of measurement reporting configurations.

In some embodiments of the third aspect, the processing circuitry is further configured to cause the UE to receive the control information by being configured to cause the UE to receive a Medium Access Control, MAC, Control Element, CE activating the at least one of the plurality of measurement reporting configurations. In some embodiments of the third aspect, the processing circuitry is further configured to cause the UE to receive the control information by being configured to cause the UE to receive a bitmap activating the at least one of the plurality of measurement reporting configurations. In some embodiments of the third aspect, the processing circuitry is further configured to cause the UE to receive the control information by being configured to cause the UE to receive a Medium Access Control, MAC, Control Element, CE activating a subset of the plurality of measurement reporting configurations. In some embodiments of the third aspect, the processing circuitry is further configured to select at least one measurement reporting configuration from the activated subset of the plurality of measurement reporting configurations. In some embodiments of the third aspect, the processing circuitry is further configured to report the at least one measurement by being configured to cause the UE to report the at least one measurement based at least in part on the selected at least one measurement reporting configuration.

According to a fourth aspect of the present disclosure, a method implemented in a user equipment, UE, is provided. The method includes receiving an indication of a plurality of measurement reporting configurations associated with a measurement object configuration. The method includes receiving control information activating at least one of the plurality of measurement reporting configurations. The method includes reporting at least one measurement based at least in part on the activated at least one of the plurality of measurement reporting configurations.

In some embodiments of the fourth aspect, the receiving the control information further includes receiving a Medium Access Control, MAC, Control Element, CE activating the at least one of the plurality of measurement reporting configurations. In some embodiments of the fourth aspect, the receiving the control information further comprises receiving a bitmap activating the at least one of the plurality of measurement reporting configurations. In some embodiments of the fourth aspect, the receiving the control information further comprises receiving a Medium Access Control, MAC, Control Element, CE activating a subset of the plurality of measurement reporting configurations. In some embodiments of the fourth aspect, the method further includes selecting at least one measurement reporting configuration from the activated subset of the plurality of measurement reporting configurations. In some embodiments of the fourth aspect, the reporting the at least one measurement further comprises reporting the at least one measurement based at least in part on the selected at least one measurement reporting configuration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 2 is a block diagram of a SP CSI reporting on PUCCH activation/deactivation MAC CE;

DETAILED DESCRIPTION

Figure 1:
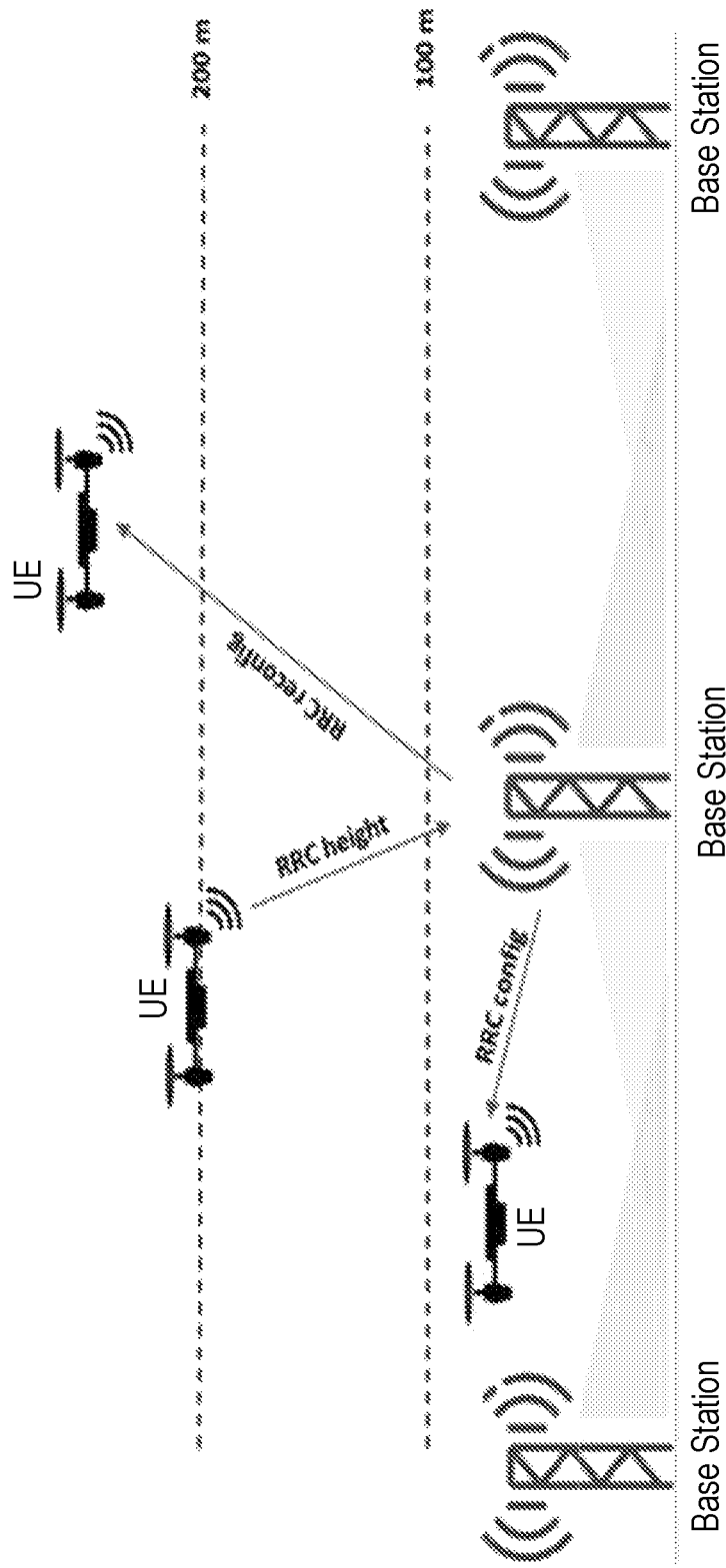
FIG. 1 is a diagram that illustrates an example system with aerial UEs.

Before describing in detail exemplary embodiments, it is noted that the embodiments reside primarily in combinations of apparatus components and processing steps related to activating at least one indicated measurement reporting configuration. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "base station" used herein can be any kind of base station comprised in a radio network which may further comprise any of network node, radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a user equipment (UE) such as a UE or a radio base station.

In some embodiments, the non-limiting terms wireless device (WD) or a user equipment (UE) are used interchangeably. The UE herein can be any type of wireless device capable of communicating with a base station or another UE over radio signals, such as UE. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a UE or base station may be distributed over a plurality of UEs and/or base stations. In other words, it is contemplated that the functions of the base station and UE described herein are not limited to performance by a single physical device and, in fact, can be distributed among several physical devices.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells, e.g., a PCell and/or a LA cell.

Configuring a terminal or user equipment or node may involve instructing and/or causing the user equipment or node to change its configuration, e.g., at least one setting and/or register entry and/or operational mode. A terminal or user equipment or node may be adapted to configure itself, e.g., according to information or data in a memory of the terminal or user equipment. Configuring a node or terminal or user equipment by another device or node or a network may refer to and/or comprise transmitting information and/ or data and/or instructions to the user equipment or node by the other device or node or the network, e.g., allocation data (which may also be and/or comprise configuration data) and/or scheduling data and/or scheduling grants. Configuring a user equipment may include sending allocation/configuration data to the user equipment indicating which modulation and/or encoding to use. A user equipment may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for activation of at least one indicated measurement reporting configuration such as via a Medium Access Control (MAC) Control Element (CE), thereby allowing for faster network controlled switching between RRM report Configurations than existing methods.

Figure 3:
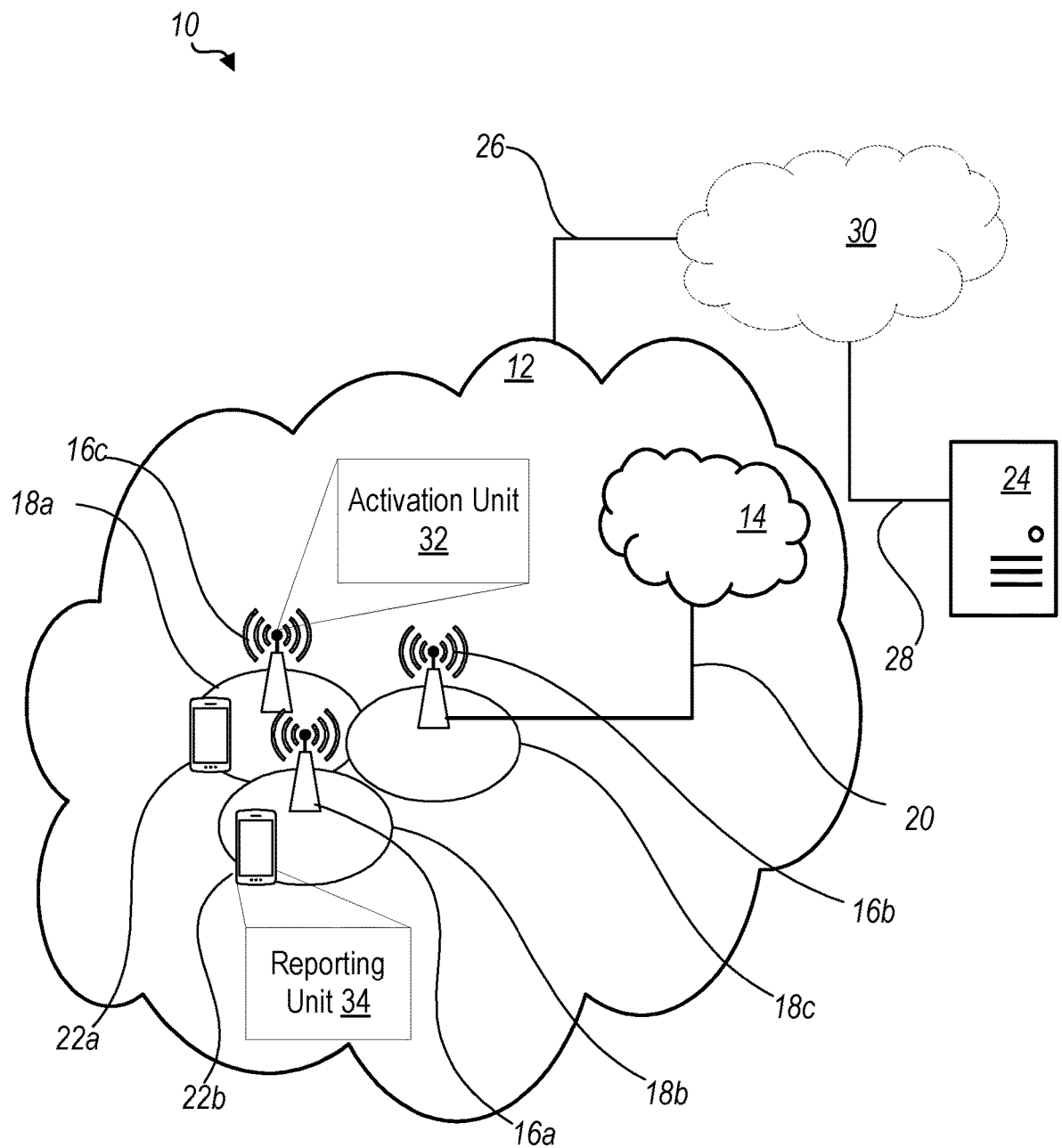
FIG. 3 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of base stations 16a, 16b, 16c (referred to collectively as base stations 16), such as NBs, eNBs, gNBs or other types of wireless access points, each defining a corresponding coverage area 18a, 18b, 18c (referred to collectively as coverage areas 18). Each base station 16a, 16b, 16c is connectable to the core network 14 over a wired or wireless connection 20. A first user equipment (UE) 22a located in coverage area 18a is configured to wirelessly connect to, or be paged by, the corresponding base station 16c. A second UE 22b in coverage area 18b is wirelessly connectable to the corresponding base station 16a. While a plurality of UEs 22a, 22b (collectively referred to as user equipments 22) are illustrated in this example, the disclosed embodiments are equally applicable to a situation where a sole UE is in the coverage area or where a sole UE is connecting to the corresponding base station 16. Note that although only two UEs 22 and three base stations 16 are shown for convenience, the communication system may include many more UEs 22 and base stations 16.

Also, it is contemplated that a UE 22 can be in simultaneous communication and/or configured to separately communicate with more than one base station 16 and more than one type of base station 16. For example, a UE 22 can have dual connectivity with a base station 16 that supports LTE and the same or a different base station 16 that supports NR. As an example, UE 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected UEs 22a, 22b and the host computer 24. The connectivity may be described as an over-the-top (OTT) connection. The host computer 24 and the connected UEs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a base station 16 may not or need not be informed about the past routing of an incoming downlink communication with data originating from a host computer 24 to be forwarded (e.g., handed over) to a connected UE 22a. Similarly, the base station 16 need not be aware of the future routing of an outgoing uplink communication originating from the UE 22a towards the host computer 24.

A base station 16 is configured to include an activation unit 32 which is configured to activate at least one indicated measurement reporting configuration, as described herein. A user equipment 22 is configured to include a reporting unit 34 which is configured to report a measurement based at least in part on at least one activated measurement reporting configuration, as described herein.

Example implementations, in accordance with an embodiment, of the UE 22, base station 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a UE 22 connecting via an OTT connection 52 terminating at the UE 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the base station 16 and or the user equipment 22. The processing circuitry 42 of the host computer 24 may include an information unit 54 configured to enable the service provider to provide information such as an indication and/or control information, described herein, for activation of at least one measurement reporting configuration.

The communication system 10 further includes a base station 16 provided in a communication system 10 and comprising hardware 58 enabling it to communicate with the host computer 24 and with the UE 22. The hardware 58 may include a communication interface 60 for setting up and maintaining a wired or wireless connection with an interface of a different communication device of the communication system 10, as well as a radio interface 62 for setting up and maintaining at least a wireless connection 64 with a UE 22 located in a coverage area 18 served by the base station 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the base station 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the base station 16 further has software 74 stored internally in, for example, memory 72, or stored in external memory (e.g., database, storage array, network storage device, etc.) accessible by the base station 16 via an external connection. The software 74 may be executable by the processing circuitry 68. The processing circuitry 68 may be configured to control any of the methods and/or processes described herein and/or to cause such methods, and/or processes to be performed, e.g., by base station 16. Processor 70 corresponds to one or more processors 70 for performing base station 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to base station 16. For example, processing circuitry 68 of the base station 16 may include activation unit 32 configured to activate at least one indicated measurement reporting configuration.

The communication system 10 further includes the UE 22 already referred to. The UE 22 may have hardware 80 that may include a radio interface 82 configured to set up and maintain a wireless connection 64 with a base station 16 serving a coverage area 18 in which the UE 22 is currently located. The radio interface 82 may be formed as or may include, for example, one or more RF transmitters, one or more RF receivers, and/or one or more RF transceivers.

The hardware 80 of the UE 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 90, which is stored in, for example, memory 88 at the UE 22, or stored in external memory (e.g., database, storage array, network storage device, etc.) accessible by the UE 22. The software 90 may be executable by the processing circuitry 84. The software 90 may include a client application 92. The client application 92 may be operable to provide a service to a human or non-human user via the UE 22, with the support of the host computer 24. In the host computer 24, an executing host application 50 may communicate with the executing client application 92 via the OTT connection 52 terminating at the UE 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by UE 22. The processor 86 corresponds to one or more processors 86 for performing UE 22 functions described herein. The UE 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to UE 22. For example, the processing circuitry 84 of the user equipment 22 may include a reporting unit 34 configured to report at least one measurement based at least in part on at least one activated measurement reporting configuration.

Figure 4:
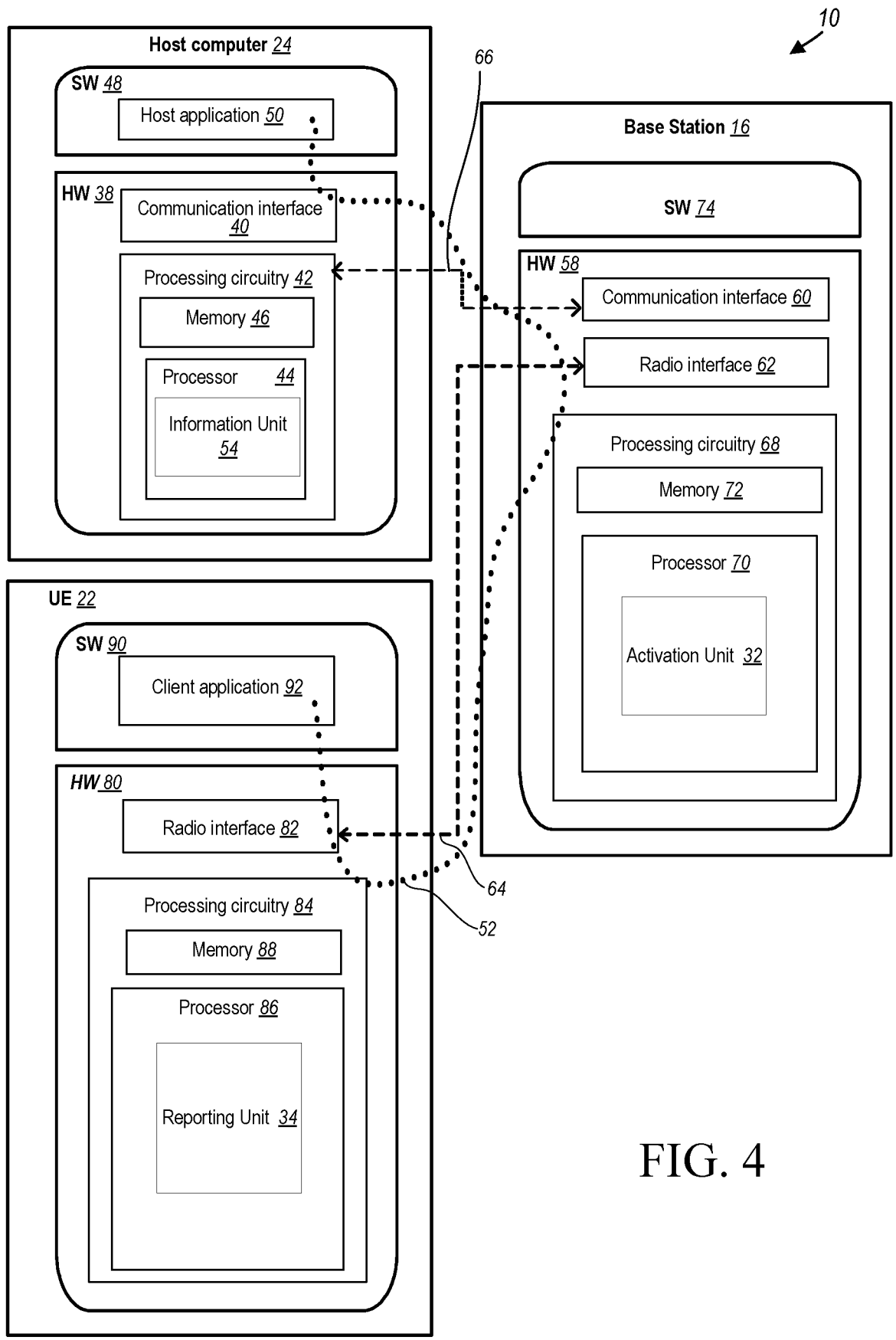
FIG. 4 is a block diagram of a host computer communicating via a base station with a user equipment over an at least partially wireless connection according to some embodiments of the present disclosure.

In some embodiments, the inner workings of the base station 16, UE 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the user equipment 22 via the base station 16, without explicit reference to any intermediary devices and the precise routing of messages via these devices. Network infrastructure may determine the routing, which it may be configured to hide from the UE 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the UE 22 and the base station 16 is in accordance with the teachings of the embodiments described throughout this disclosure. One or more of the various embodiments improve the performance of OTT services provided to the UE 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and UE 22, in response to variations in the measurement results. The measurement procedure and/or the network functionality for reconfiguring the OTT connection 52 may be implemented in the software 48 of the host computer 24 or in the software 90 of the UE 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the base station 16, and it may be unknown or imperceptible to the base station 16. Some such procedures and functionalities may be known and practiced in the art. In certain embodiments, measurements may involve proprietary UE signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the UE 22. In some embodiments, the cellular network also includes the base station 16 with a radio interface 62. In some embodiments, the base station 16 is configured to, and/or the base station's 16 processing circuitry 68 is configured to perform the functions and/or methods described herein for preparing/initiating/maintaining/supporting/ending a transmission to the UE 22, and/or preparing/terminating/maintaining/supporting/ending in receipt of a transmission from the UE 22.

In some embodiments, the host computer 24 includes processing circuitry 42 and a communication interface 40 that is configured to a communication interface 40 configured to receive user data originating from a transmission from a UE 22 to a base station 16. In some embodiments, the UE 22 is configured to, and/or comprises a radio interface 82 and/or processing circuitry 84 configured to perform the functions and/or methods described herein for preparing/initiating/maintaining/supporting/ending a transmission to the base station 16, and/or preparing/terminating/maintaining/supporting/ending in receipt of a transmission from the base station 16.

Although FIGS. 3 and 4 show various "units" such as activation unit 32, and reporting unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
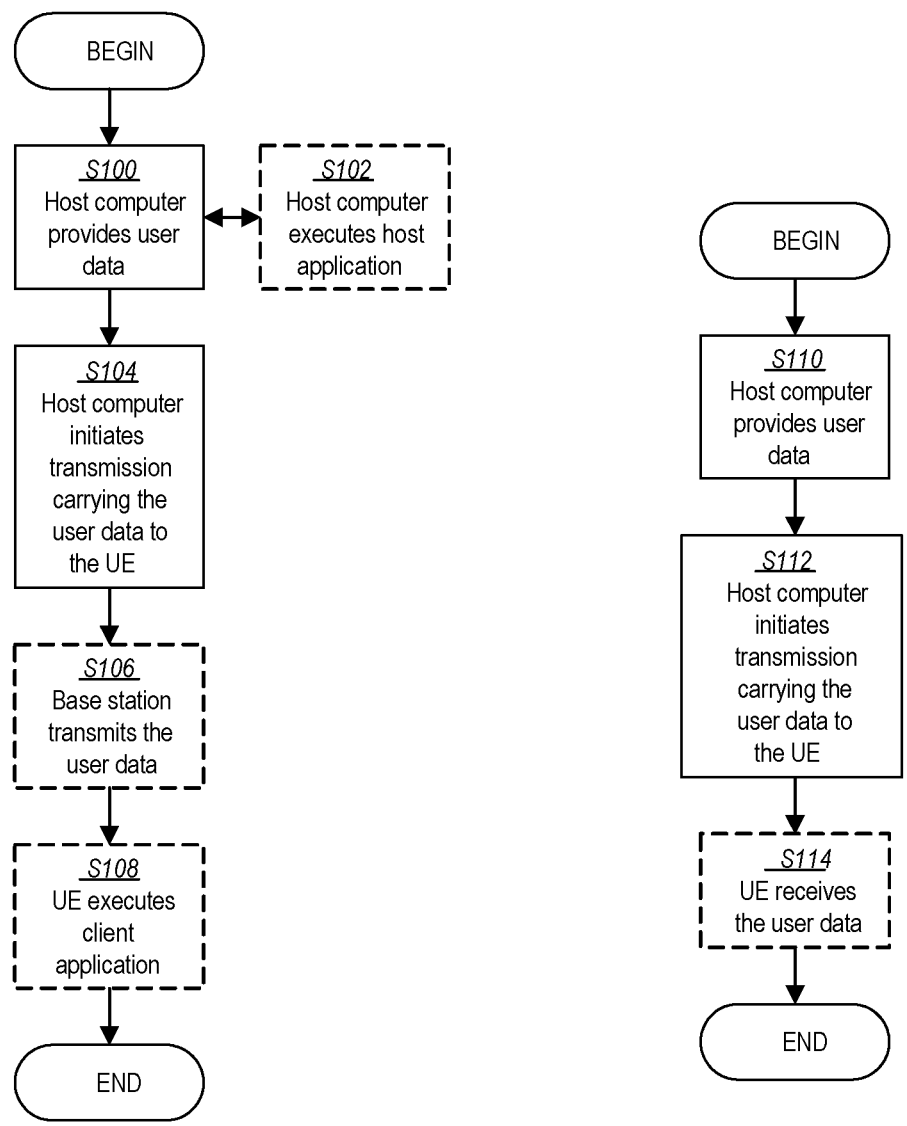
FIG. 5 is a flowchart illustrating an exemplary method implemented in a communication system including a host computer, a base station and a wireless device according to some embodiments of the present disclosure.
FIG. 6 is a flowchart illustrating an exemplary method implemented in a communication system including a host computer, a base station and a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a base station 16 and a UE 22, which may be those described with reference to FIG. 4. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the UE 22 (block S104). In an optional third step, the base station 16 transmits to the UE 22 the user data which was carried in the transmission that the host computer 24 initiated, in accordance with the teachings of the embodiments described throughout this disclosure (block S106). In an optional fourth step, the UE 22 executes a client application, such as, for example, the client application 114, associated with the host application 74 executed by the host computer 24 (block S108).

FIG. 6 is a flowchart illustrating an exemplary method implemented in a communication system, such as, for example, the communication system of FIG. 3, in accordance with one embodiment. The communication system may include a host computer 24, a base station 16 and a UE 22, which may be those described with reference to FIGS. 3 and 4. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the UE 22 (block S112). The transmission may pass via the base station 16, in accordance with the teachings of the embodiments described throughout this disclosure. In an optional third step, the UE 22 receives the user data carried in the transmission (block S114).

Figures 7, 8:
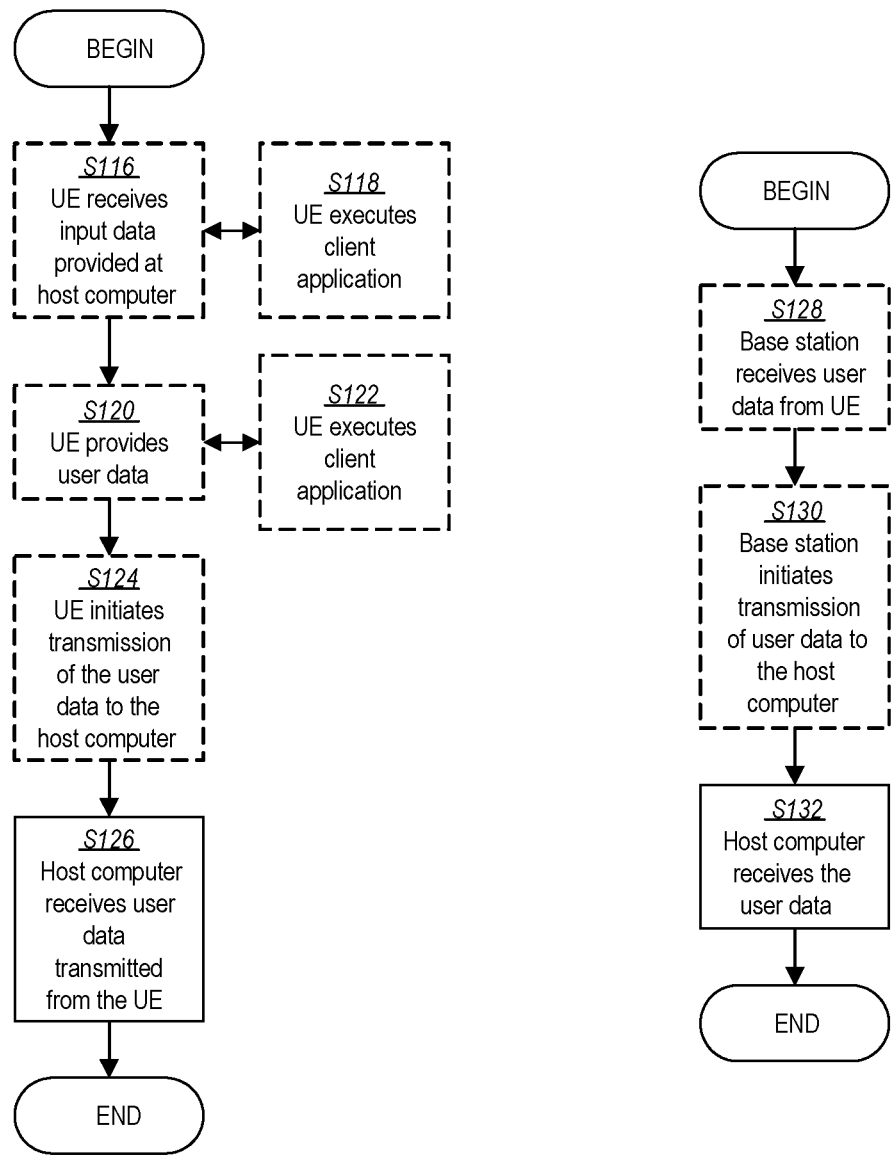
FIG. 7 is a flowchart illustrating an exemplary method implemented in a communication system including a host computer, a base station and a wireless device according to some embodiments of the present disclosure.
FIG. 8 is a flowchart illustrating an exemplary method implemented in a communication system including a host computer, a base station and a wireless device according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a base station 16 and a UE 22, which may be those described with reference to FIGS. 3 and 4. In an optional first step of the method, the UE 22 receives input data provided by the host computer 24 (block S116). In an optional substep of the first step, the UE 22 executes the client application 114, which provides the user data in reaction to the received input data provided by the host computer 24 (block S118). Additionally or alternatively, in an optional second step, the UE 22 provides user data (block S120). In an optional substep of the second step, the UE provides the user data by executing a client application, such as, for example, client application 114 (block S122). In providing the user data, the executed client application 114 may further consider user input received from the user. Regardless of the specific manner in which the user data was provided, the UE 22 may initiate, in an optional third substep, transmission of the user data to the host computer 24 (block S124). In a fourth step of the method, the host computer 24 receives the user data transmitted from the UE 22, in accordance with the teachings of the embodiments described throughout this disclosure (block S126).

FIG. 8 is a flowchart illustrating an exemplary method implemented in a communication system, such as, for example, the communication system of FIG. 3, in accordance with one embodiment. The communication system may include a host computer 24, a base station 16 and a UE 22, which may be those described with reference to FIGS. 3 and 4. In an optional first step of the method, in accordance with the teachings of the embodiments described throughout this disclosure, the base station 16 receives user data from the UE 22 (block S128). In an optional second step, the base station 16 initiates transmission of the received user data to the host computer 24 (block S130). In a third step, the host computer 24 receives the user data carried in the transmission initiated by the base station 16 (block S132).

Figure 9:
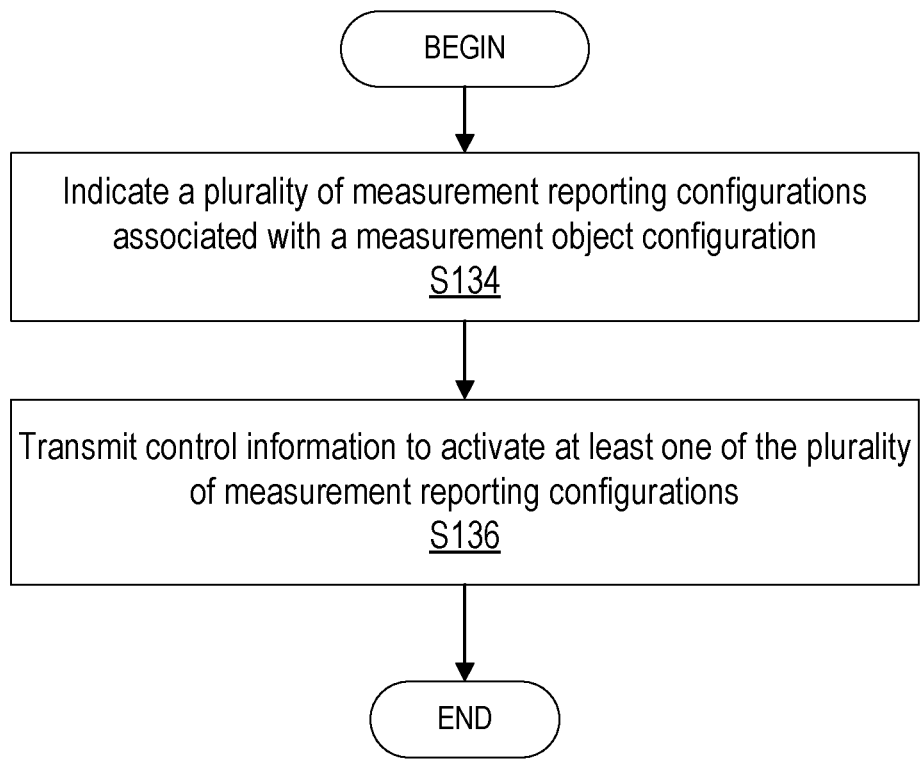
FIG. 9 is a flowchart of an exemplary process in a base station for activating at least one indicated measurement reporting configuration according to some embodiments of the present disclosure.

FIG. 9 is a flowchart of an exemplary process in a base station 16 for activating at least one indicated measurement reporting configuration as described herein. One or more Blocks and/or functions and/or methods performed by the base station 16 may be performed by one or more elements of base station 16 such as by Activation unit 32, processing circuitry 68, processor 70, radio interface 62, etc. according to the example method. The method includes indicating, such as via Activation unit 32, processing circuitry 68, processor 70 and/or radio interface 62, a plurality of measurement reporting configurations associated with a measurement object configuration, as described herein (block S134). The method includes transmitting, such as via Activation unit 32, processing circuitry 68, processor 70 and/or radio interface 62, control information to activate at least one of the plurality of measurement reporting configurations, as described herein (block S136).

According to some embodiments, the transmitting the control information further includes transmitting, such as via Activation unit 32, processing circuitry 68, processor 70 and/or radio interface 62, a Medium Access Control, MAC, Control Element, CE to activate the at least one of the plurality of measurement reporting configurations. According to some embodiments, the transmitting the control information further includes transmitting, such as via Activation unit 32, processing circuitry 68, processor 70 and/or radio interface 62, a bitmap to activate the at least one of the plurality of measurement reporting configurations. In some embodiments, the transmitting the control information further includes transmitting, such as via Activation unit 32, processing circuitry 68, processor 70 and/or radio interface 62, a Medium Access Control, MAC, Control Element, CE to activate a subset of the plurality of measurement reporting configurations, the subset being selectable by the UE 22.

According to some embodiments, the control information is a Medium Access Control (MAC) Control Element (CE). According to some embodiments, the activation of at least one of the plurality of measurement reporting configurations includes activation of a plurality of measurement reporting configurations for UE 22 selection.

Figure 10:
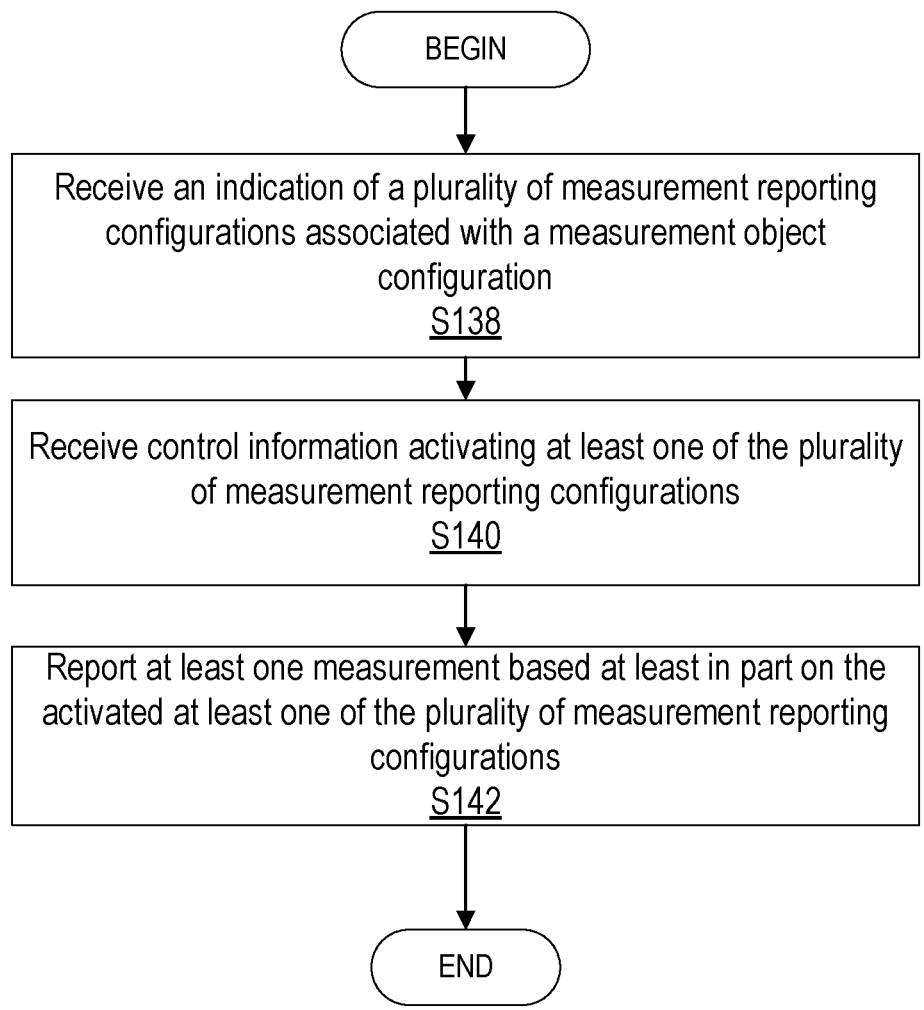
FIG. 10 is a flowchart of an exemplary process in a user equipment for reporting according to at least one measurement reporting configuration according to some embodiments of the present disclosure.

FIG. 10 is a flowchart of an exemplary process in a user equipment 22 according to some embodiments of the present disclosure. One or more Blocks and/or functions and/or methods performed by UE 22 may be performed by one or more elements of UE 22 such as by Reporting unit 34 in processing circuitry 84, processor 86, radio interface 82, etc. The method includes receiving, such as via Reporting unit 34, processing circuitry 84, processor 86 and/or radio interface 82, an indication of a plurality of measurement reporting configurations associated with a measurement object configuration, as described herein (block S138). The method includes receiving, such as via Reporting unit 34, processing circuitry 84, processor 86 and/or radio interface 82, control information activating at least one of the plurality of measurement reporting configurations, as described herein (block S140). The method includes reporting, such as via Reporting unit 34, processing circuitry 84, processor 86 and/or radio interface 82, at least one measurement based at least in part on the activated at least one of the plurality of measurement reporting configurations, as described herein (block S142).

In some embodiments, the receiving the control information further includes receiving, such as via Reporting unit 34, processing circuitry 84, processor 86 and/or radio interface 82, a Medium Access Control, MAC, Control Element, CE activating the at least one of the plurality of measurement reporting configurations. In some embodiments, the receiving the control information further includes receiving, such as via Reporting unit 34, processing circuitry 84, processor 86 and/or radio interface 82, a bitmap activating the at least one of the plurality of measurement reporting configurations. In some embodiments, the receiving the control information further comprises receiving, such as via Reporting unit 34, processing circuitry 84, processor 86 and/or radio interface 82, a Medium Access Control, MAC, Control Element, CE activating a subset of the plurality of measurement reporting configurations. In some embodiments, the method includes selecting, such as via Reporting unit 34, processing circuitry 84, processor 86 and/or radio interface 82, at least one measurement reporting configuration from the activated subset of the plurality of measurement reporting configurations. In some embodiments, the reporting the at least one measurement further includes reporting, such as via Reporting unit 34, processing circuitry 84, processor 86 and/or radio interface 82, the at least one measurement based at least in part on the selected at least one measurement reporting configuration.

According to some embodiments, the control information is a Medium Access Control (MAC) Control Element (CE). According to some embodiments, the activation of at least one of the plurality of measurement reporting configurations includes activation of a plurality of measurement reporting configurations for UE 22 selection.

Some embodiments provide for activation of at least one indicated measurement reporting configuration for a UE 22 using control information such as a MAC CE, thereby allowing for faster network controlled switching between RRM report Configurations for a UE 22 than existing methods. Having generally described arrangements for activation of at least one indicated measurement reporting configuration for a UE 22 using control information, details for these arrangements, functions and processes are provided as follows, and which may be implemented by the base station 16, UE 22 and/or host computer 24.

Example 1

In this example, a UE 22 may first be configured by an RRC with multiple measurement reporting configurations. A MAC CE is then used to activate one of the measurement reporting configurations. The MAC CE can carry, for example, a bitmap with each bit representing one of the measurement reporting configurations. For instance, if N measurement reporting configurations are configured, the bitmap [b0, b1, . . . , bN-1] is included in the MAC CE message. If the nth measurement reporting configuration is to be activated for the measurement object, then the nth bit, bn, can be set to 1 (i.e., 1 indicates activation) and the remaining bits corresponding to the other measurement reporting configurations can be set to 0 (i.e., 0 indicates deactivation).

In an alternative embodiment of this example, the reportConfigId (report configuration identifier/identification) corresponding to the measurement reporting configuration can be included in the MAC CE message. In this alternative embodiment, only the measurement reporting configuration corresponding to the reportConfigId included in the MAC CE message may be considered activated and the other measurement reporting configurations may be considered deactivated.

By activating a particular measurement reporting configuration, this embodiment may provide a faster network controlled solution to switching between measurement reporting configurations than the existing solutions/systems.

Example 2

In this example, a UE 22 may first be configured by an RRC with multiple measurement reporting configurations associated with a measurement object configuration. A MAC CE is then used to activate a subset of the measurement reporting configurations. The MAC CE can carry, for example, a bitmap with each bit representing one of the measurement reporting configurations. For instance, if N measurement reporting configurations are configured, the bitmap [b0, b1, . . . , bN-1] is included in the MAC CE message. If a subset of the measurement reporting configurations is to be activated, then the bits corresponding to the measurement reporting configurations to be activated are set to 1 and the other bits are set to 0. Since multiple measurement reporting configurations are activated in this embodiment, the UE can choose one of the activated measurement reporting configurations conditioned on the UE's height or flight mode.

By activating multiple measurement reporting configurations and letting the UE choose one of the activated measurement reporting configurations based on UE's height or flight mode or other UE based criterion, this example embodiment provides a network semi-controlled solution to switching between measurement reporting configurations. This arrangement can be a tradeoff between the solution in Example 1 and the solution of pure UE based scaling when it comes to the time for switching between measurement reporting configurations.

In addition, some embodiments may include one or more of the following:

Embodiment A1

A base station configured to communicate with a user equipment (UE), the base station configured to, and/or comprising a radio interface and/or comprising processing circuitry configured to:

indicate a plurality of measurement reporting configurations associated with a measurement object configuration; and transmit control information to activate at least one of the plurality of measurement reporting configurations.

Embodiment A2

The base station of Embodiment A1, wherein the control information is a Medium Access Control (MAC) Control Element (CE).

Embodiment A3

The base station of Embodiment A1, wherein the activation of at least one of the plurality of measurement reporting configurations includes activation a plurality of measurement reporting configurations for UE selection.

Embodiment B 1

A method implemented in a base station, the method comprising:

indicating a plurality of measurement reporting configurations associated with a measurement object configuration; and transmitting control information to activate at least one of the plurality of measurement reporting configurations.

Embodiment B2

The method of Embodiment B1, wherein the control information is a Medium Access Control (MAC) Control Element (CE).

Embodiment B3

The method of Embodiment B1, wherein the activation of at least one of the plurality of measurement reporting configurations includes activation a plurality of measurement reporting configurations for UE selection.

Embodiment C1

A user equipment (UE) configured to communicate with a base station, the UE configured to, and/or comprising a radio interface and/or processing circuitry configured to:

receive an indication of a plurality of measurement reporting configurations associated with a measurement object configuration;

receive control information activating at least one of the plurality of measurement reporting configurations; and report at least one measurement based on the activated at least one of the plurality of measurement reporting configurations.

Embodiment C2

The UE of Embodiment C1, wherein the control information is a Medium Access Control (MAC) Control Element (CE).

Embodiment C3

The UE of Embodiment C1, wherein the activation of at least one of the plurality of measurement reporting configurations includes activation a plurality of measurement reporting configurations; and the UE further configured to, and/or comprising a radio interface and/or processing circuitry configured to select a measurement reporting configuration from among the activated plurality of measurement reporting configurations, the reported at least one measurement being based on the selection.

Embodiment D1

A method implemented in a user equipment (UE), the method comprising:

receiving an indication of a plurality of measurement reporting configurations associated with a measurement object configuration;

receiving control information activating at least one of the plurality of measurement reporting configurations; and reporting at least one measurement based on the activated at least one of the plurality of measurement reporting configurations.

Embodiment D2

The method of Embodiment D1, wherein the control information is a Medium Access Control (MAC) Control Element (CE).d Embodiment D3

The method of Embodiment D1, wherein the activation of at least one of the plurality of measurement reporting configurations includes activation a plurality of measurement reporting configurations; and the method further comprising selecting a measurement reporting configuration from among the activated plurality of measurement reporting configurations, the reported at least one measurement being based on the selection.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings, without departing from the scope of the following claims.

What is claimed is:

1. A base station configured to communicate with a user equipment, UE, the base station comprising processing circuitry, the processing circuitry configured to cause the base station to:
    indicate a plurality of measurement reporting configurations associated with a measurement object configuration; and
    transmit control information to activate at least one of the plurality of measurement reporting configurations, the base station being caused to transmit the control information by being configured to transmit a Medium Access Control, MAC, Control Element, CE, to activate a subset of the plurality of measurement reporting configurations, the subset being selectable by the UE based on at least one of the UE's height and flight mode.

2. The base station of claim 1, wherein the processing circuitry is further configured to cause the base station to transmit the control information by being configured to cause the base station to:
    transmit a bitmap to activate the at least one of the plurality of measurement reporting configurations.

3. A method implemented in base station, the method comprising:
    indicating a plurality of measurement reporting configurations associated with a measurement object configuration; and
    transmitting control information to activate at least one of the plurality of measurement reporting configurations, transmitting the control information comprising:
    transmitting a Medium Access Control, MAC, Control Element, CE to activate a subset of the plurality of measurement reporting configurations, the subset being selectable by the UE based on one of the UE's height and flight mode.

4. The method of claim 3, wherein the transmitting the control information further comprises:
    transmitting a bitmap to activate the at least one of the plurality of measurement reporting configurations.

5. A user equipment, UE, configured to communicate with a base station, the UE comprising processing circuitry, the processing circuitry configured to cause the UE to:
    receive an indication of a plurality of measurement reporting configurations associated with a measurement object configuration;

receive control information activating at least one of the plurality of measurement reporting configurations, the UE receiving the control information by being configured to receive a Medium Access Control, MAC, Control Element, CE activating a subset of the plurality of measurement reporting configurations;

select at least one measurement reporting configuration from the activated subset of the plurality of measurement reporting configurations based on one of the UE's height and flight mode; and report at least one measurement based at least in part on the activated at least one of the plurality of measurement reporting configurations.

6. The UE of claim 5, wherein the processing circuitry is further configured to cause the UE to receive the control information by being configured to cause the UE to:

receive a bitmap activating the at least one of the plurality of measurement reporting configurations.

7. The UE of claim 5, wherein the processing circuitry is further configured to report the at least one measurement by being configured to cause the UE to:

report the at least one measurement based at least in part on the selected at least one measurement reporting configuration.

8. A method implemented in a user equipment, UE, the method comprising:

receiving an indication of a plurality of measurement reporting configurations associated with a measurement object configuration;

receiving control information activating at least one of the plurality of measurement reporting configurations, receiving the control information comprising receiving a Medium Access Control, MAC, Control Element, CE activating a subset of the plurality of measurement reporting configurations;

selecting at least one measurement reporting configuration from the activated subset of the plurality of measurement reporting configurations based on one of the UE's height and flight mode; and reporting at least one measurement based at least in part on the activated at least one of the plurality of measurement reporting configurations.

9. The method of claim 8, wherein the receiving the control information further comprises:

receiving a bitmap activating the at least one of the plurality of measurement reporting configurations.

10. The method of claim 8, wherein the reporting the at least one measurement further comprises:

reporting the at least one measurement based at least in part on the selected at least one measurement reporting configuration.

* * * * *